(12) United States Patent
Tan et al.

(10) Patent No.: US 12,743,608 B2
(45) Date of Patent: Sep. 22, 2026

(54) NEURON CIRCUITS FOR A SPIKING NEURAL NETWORK BASED ON MAGNETIC-TUNNEL-JUNCTION LAYER STACKS CONNECTED IN SERIES

(71) Applicant: GlobalFoundries Singapore Pte. Ltd., Singapore (SG)

(72) Inventors: Joel Tan, Singapore (SG); Vinayak Bharat Naik, Singapore (SG); Jia Hao Lim, Singapore (SG)

(73) Assignee: GlobalFoundries Singapore Pte. Ltd., Singapore (SG)

( * ) Notice: Subject to any disclaimer, the term of this patent is extended or adjusted under 35 U.S.C. 154(b) by 505 days.

(21) Appl. No.: 18/377,844

(22) Filed: Oct. 9, 2023

(65) Prior Publication Data

US 2025/0117634 A1 Apr. 10, 2025

(51) Int. Cl.
*G06N 3/049* (2023.01)
*G06N 3/047* (2023.01)
*G06N 3/063* (2023.01)

(52) U.S. Cl.
CPC ............. *G06N 3/049* (2013.01); *G06N 3/047* (2023.01); *G06N 3/063* (2013.01)

(58) Field of Classification Search
CPC ......... G06N 3/049; G06N 3/047; G06N 3/063
USPC ............................................................ 706/15
See application file for complete search history.

(56) References Cited

U.S. PATENT DOCUMENTS 9,455,011 B2 * 9/2016 Raychowdhury ... G11C 11/1693
2019/0130954 A1 5/2019 Camsari et al.
2020/0254181 A1 * 8/2020 Mosebach ........... A61M 5/2033
2021/0150317 A1 5/2021 Hou et al.
2022/0350572 A1 11/2022 Fukami et al.

OTHER PUBLICATIONS

Sengupta et al., "Magnetic tunnel junction mimics stochastic cortical spiking neurons", Scientific reports, 6:30039, Jul. 21, 2016 (Year: 2016).*

Jin et al., "Detection of small magnetic fields using serial magnetic tunnel junctions with various geometrical characteristics", Sensors 2020, 20, 5704, Oct. 7, 2020 (Year: 2020).*

Naik, Vinayak Bharat et al., "Spiking Neural Network Hardware Based on Magnetic-Tunnel-Junction Layer Stacks" filed on Oct. 27, 2022 as a U.S. Appl. No. 17/974,790.

* cited by examiner

*Primary Examiner* — Tsu-Chang Lee
(74) *Attorney, Agent, or Firm* — Thompson Hine LLP

(57) ABSTRACT

Structures including multiple magnetic-tunnel-junction layer stacks and methods of forming such structures. The structure comprises a first magnetic-tunneling-junction layer stack, a second magnetic-tunneling-junction layer stack connected in a series connection to the first magnetic-tunneling-junction layer stack, and a pulsed power supply connected to the first and second magnetic-tunneling-junction layer stacks.

20 Claims, 2 Drawing Sheets

NEURON CIRCUITS FOR A SPIKING NEURAL NETWORK BASED ON MAGNETIC-TUNNEL-JUNCTION LAYER STACKS CONNECTED IN SERIES

BACKGROUND

The present disclosure relates to integrated circuits and semiconductor device fabrication and, more specifically, to structures including multiple magnetic-tunnel-junction layer stacks and methods of forming such structures.

A neural network is a system of hardware and/or software patterned after the operation of neurons in the human brain. A spiking neural network is a type of neural network that operates using voltage spikes, which are discrete events that take place at points in time, rather than continuous values. Essentially, a voltage spike by any particular neuron occurs after reaching a sufficiently high potential, after which the potential of the neuron is reset.

Improved structures including multiple magnetic-tunnel-junction layer stacks and methods of forming such structures are needed.

SUMMARY

According to an embodiment of the invention, a structure comprises a first magnetic-tunneling-junction layer stack, a second magnetic-tunneling-junction layer stack connected in a series connection to the first magnetic-tunneling-junction layer stack, and a pulsed power supply connected to the first magnetic-tunneling-junction layer stack and the second magnetic-tunneling-junction layer stack.

According to an embodiment of the invention, a method comprises forming a first magnetic-tunneling-junction layer stack, and forming a second magnetic-tunneling-junction layer stack connected in a series connection to the first magnetic-tunneling-junction layer stack. The first magnetic-tunneling-junction layer stack and the second magnetic-tunneling-junction layer stack are connected to a pulsed power supply.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
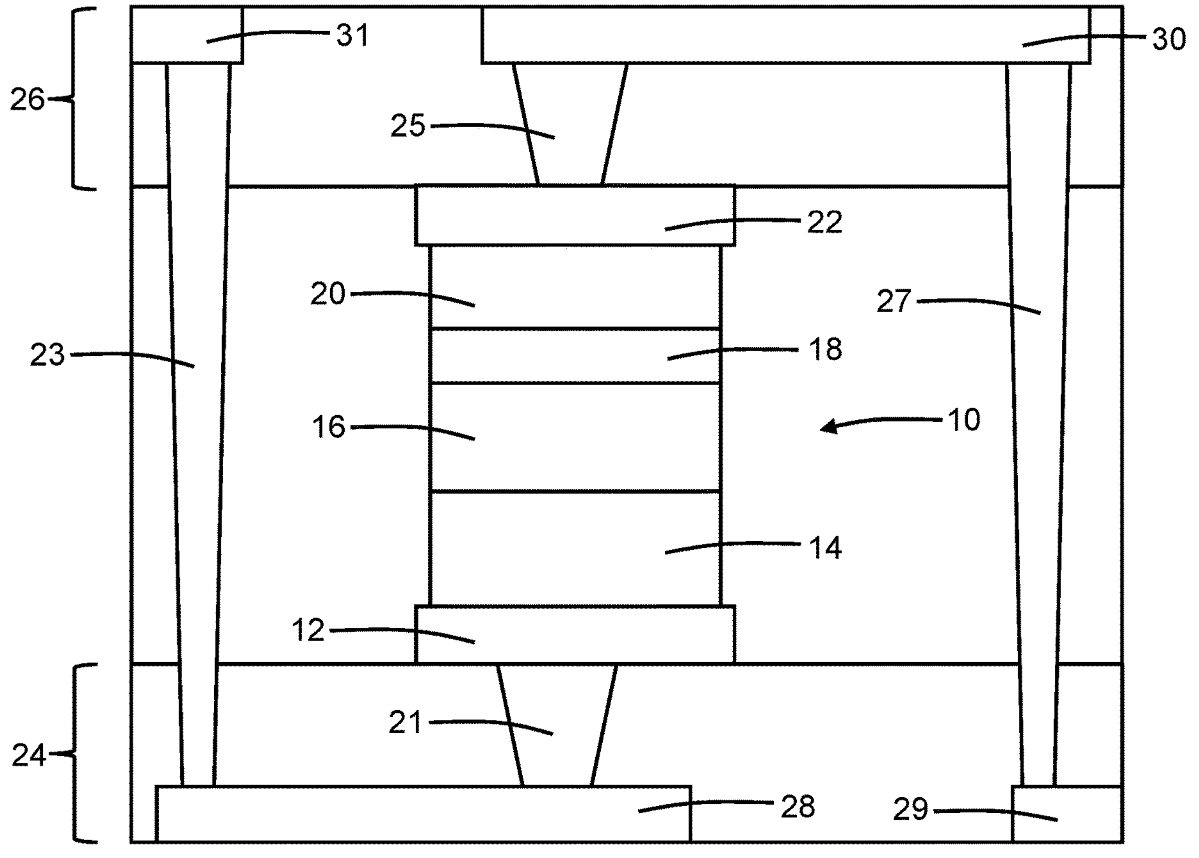
FIG. 1 is a cross-sectional view of a magnetic-tunnel-junction layer stack in accordance with embodiments of the invention.

With reference to FIG. 1 and in accordance with embodiments of the invention, a magnetic-tunneling-junction layer stack 10 for use in a neuron circuit of a spiking neural network includes an electrode 12, a synthetic antiferromagnetic pinning layer 14, a reference layer 16, a tunnel barrier layer 18, a reversible free layer 20, and an electrode 22. The layers 14, 16, 18, 20 of the magnetic-tunneling-junction layer stack 10 may be sequentially formed with a stacked arrangement by one or more deposition processes, such as physical vapor deposition processes, and patterned by one or more lithography and etching processes.

The electrode 12 may be comprised of a non-magnetic conductor, such as tantalum or tantalum nitride. The synthetic antiferromagnetic pinning layer 14 may be disposed on the electrode 12. The synthetic antiferromagnetic pinning layer 14 may be comprised of a magnetic material, such as multiple bilayers of cobalt and palladium or multiple bilayers of cobalt and platinum. The reference layer 16 may be disposed on the synthetic antiferromagnetic pinning layer 14. The reference layer 16 may be comprised of a ferromagnetic material, such as a cobalt-iron-boron alloy. The tunnel barrier layer 18 may be disposed on the reference layer 16. The tunnel barrier layer 18 may be comprised of a non-magnetic and electrically-insulating dielectric material, such as magnesium oxide. The reversible free layer 20 may be disposed on the tunnel barrier layer 18. The reversible free layer 20 may be comprised of a ferromagnetic material, such as a cobalt-iron-boron alloy. The electrode 22, which may be positioned on the reversible free layer 20, may be comprised of a non-magnetic conductor, such as tantalum or tantalum nitride. In alternative embodiments, the magnetic-tunneling-junction layer stack 10 may include additional layers arranged between the electrode 12 and electrode 22.

The magnetization of the reference layer 16 is pinned such that the magnetization is fixed and cannot switch under the influence of a current supplied by a bias voltage applied across the magnetic-tunneling-junction layer stack 10. The synthetic antiferromagnetic pinning layer 14 may provide a static magnetic field with a magnetization that functions to pin the magnetization of the reference layer 16. The magnetization of the reversible free layer 20 is not similarly pinned such that the magnetization can switch under the influence of a directional current supplied by a bias voltage applied across the magnetic-tunneling-junction layer stack 10. In particular, the magnetization of the reversible free layer 20 may be switched by an applied current to be aligned in a direction parallel to the magnetization of the reference layer 16 or switched by an oppositely-directed applied current to be aligned in a direction antiparallel to the magnetization of the reference layer 16. The electrical resistance across the tunnel barrier layer 18 between the reference layer 16 and the reversible free layer 20 in the antiparallel state may be greater than the electrical resistance across the tunnel barrier layer 18 between the reference layer 16 and the reversible free layer 20 in the parallel state.

In an alternative embodiment, the reference layer 16 may be fixed with an in-plane magnetization, and the magnetization of the reversible free layer 20 can be switched under the influence of a directional current to be oriented either parallel or antiparallel to the in-plane magnetization of the reference layer 16.

The magnetic-tunneling-junction layer stack 10 may be located between a wiring level 24 and a wiring level 26 of an interconnect structure fabricated by back-end-of-line processes. The wiring levels 24, 26 of the interconnect structure may be formed by deposition, polishing, lithography, and etching techniques characteristic of a damascene process. Specifically, for each of the wiring levels 24, 26, one or more dielectric layers may be deposited and patterned using lithography and etching processes to define trenches and via openings that are lined with a barrier layer and filled by a planarized metal to define interconnects 28, 29, 30, 31 and vias 21, 23, 25, 27. Each dielectric layer may be comprised of a dielectric material, such as silicon dioxide or a low-k dielectric material, and the interconnects 28, 29, 30, 31 and vias 21, 23, 25, 27 may be comprised of a metal, such as copper or aluminum.

The interconnect 28 in the wiring level 24 may be physically and electrically connected by the via 21 to the electrode 12 and by the via 23 to the interconnect 31 in the wiring level 26. The interconnect 30 in the wiring level 26 may be physically and electrically connected by the via 25 to the electrode 22 and by the via 27 to the interconnect 29 in the wiring level 24. The interconnect 29 may be physically and electrically connected to an electrode 12 of an adjacent magnetic-tunneling-junction layer stack to participate in a series connection with the adjacent magnetic-tunneling-junction layer stack. The interconnect 31 may be physically and electrically connected to an electrode 22 of an adjacent magnetic-tunneling-junction layer stack to participate in a series connection with the adjacent magnetic-tunneling-junction layer stack.

Figure 2:
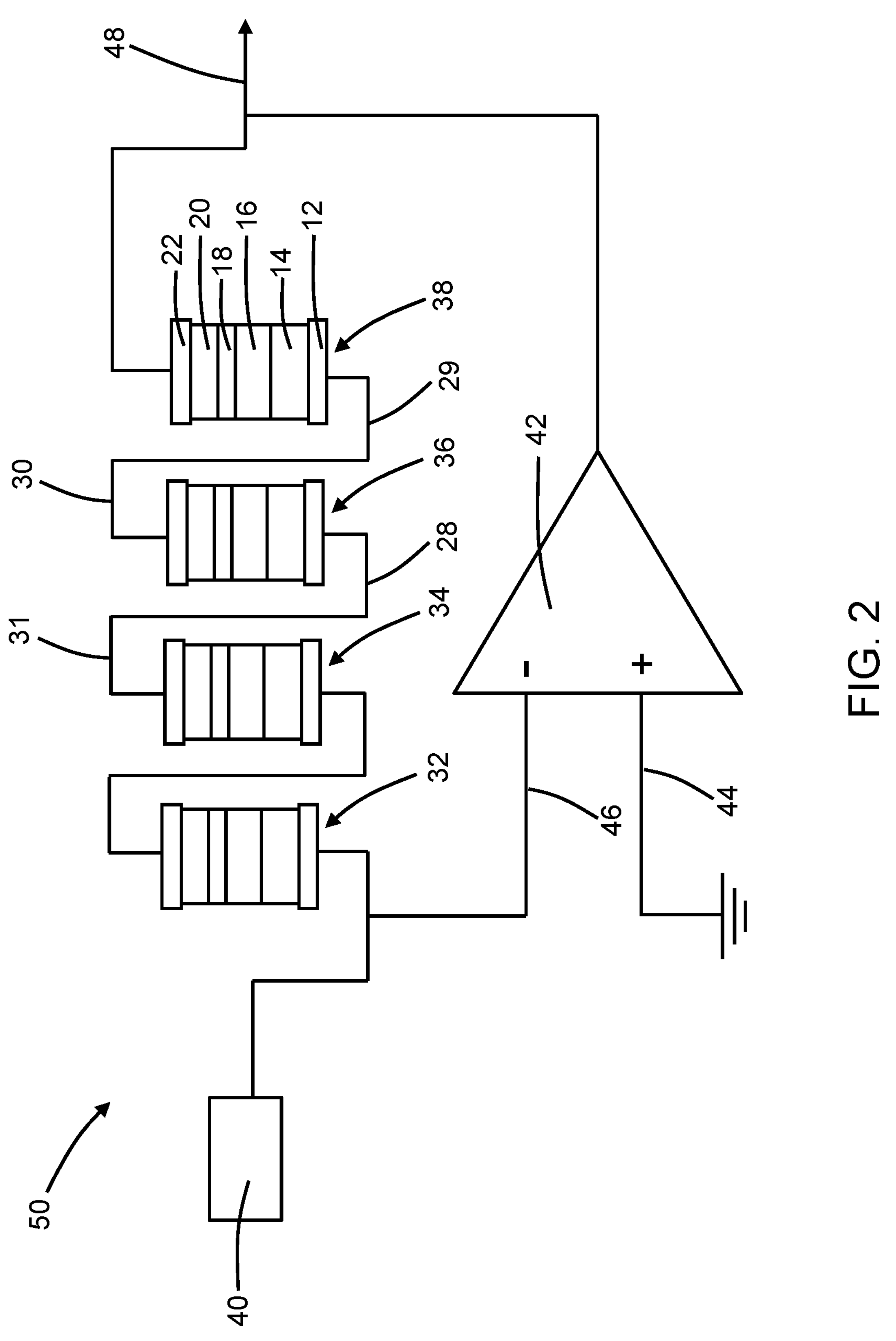
FIG. 2 is a diagrammatic view of a structure including magnetic-tunnel-junction layer stacks in accordance with alternative embodiments of the invention.

With reference to FIG. 2 and in accordance with embodiments of the invention, a structure 50 may include multiple magnetic-tunneling-junction layer stacks 32, 34, 36, 38 that are physically and electrically connected in a series connection, a pulsed current source 40, and an operational amplifier 42. The output 48 from the structure 50 may be fed to another structure similar or identical to the structure 50. Each of the magnetic-tunneling-junction layer stacks 32, 34, 36, 38 may be instances of the magnetic-tunneling-junction layer stack 10 (FIG. 1) that are connected in series as shown in FIG. 1. For example, the magnetic-tunneling-junction layer stack 36 may have electrical connections, as shown in FIG. 2, with the magnetic-tunneling-junction layer stacks 34 and 38 that are facilitated by the interconnects 28, 29, 30, 31.

The pulsed current source 40 may be connected to the electrode 12 of the magnetic-tunneling-junction layer stack 32. The pulsed current source 40, which may be integrated into driving circuitry, is configured to provide current pulses to the series-connected magnetic-tunneling-junction layer stacks 32, 34, 36, 38 that have a magnitude sufficient to cause a state change of the reversible free layer 20 of one or more of the magnetic-tunneling-junction layer stacks 32, 34, 36, 38.

The operational amplifier 42 may be connected in parallel with the series-connected magnetic-tunneling-junction layer stacks 32, 34, 36, 38. The series-connected magnetic-tunneling-junction layer stacks 32, 34, 36, 38 may effectively define a feedback loop for the operational amplifier 42. The operational amplifier 42 may have a non-inverting input 46 serving as a positive terminal that is connected to electrical ground. The operational amplifier 42 may have an inverting input 44 serving as a negative terminal that is coupled to the electrode 12 of the magnetic-tunneling-junction layer stack 32. The operational amplifier 42 may have an output that is connected to the output 48 from the structure 50 and the electrode 22 of the magnetic-tunneling-junction layer stack 38, which is also connected to the output 48.

In use, current pulses may be generated by the pulsed current source 40 and applied from the pulsed current source 40 to the magnetic-tunneling-junction layer stacks 32, 34, 36, 38. The current pulses may induce a change in the resistance state of one or more of the magnetic-tunneling-junction layer stacks 32, 34, 36, 38. The magnetization of each switched reversible free layer 20 is susceptible to back-hopping, which is an unintended switching back to an initial state after intended switching, which produces a spike. Voltage spikes from the individual magnetic-tunneling-junction layer stacks 32, 34, 36, 38 are additive, and the additive voltage spike is routed to the output 48 from the structure 50. The reversible switching embodied in back-hopping enables a device structure suitable for deployment in a neuron circuit for a spiking neural network.

The utilization of multiple series-connected magnetic-tunneling-junction layer stacks 32, 34, 36, 38 in the structure 50 may, among other benefits, increase the spike rate and control variability when deployed in a neuron circuit for a spiking neural network. Both the bit-to-bit variability and the temporal variability may be tunable through a selection of the number of series-connected magnetic-tunneling-junction layer stacks 32, 34, 36, 38. The utilization of the pulsed current source 40 in the structure 50 may, among other benefits, increase endurance in comparison to the use of a direct current voltage because pulsing may be more controllable and practical for the driving circuitry.

The back-hopping of each of the magnetic-tunneling-junction layer stacks 32, 34, 36, 38 may follow a discrete probability distribution, such as a Poisson probability distribution, to generate a voltage spike. The increase in the spike rate and improved control over variability may be attributed to the additive property of the Poisson probability distribution that results in a total voltage spike given by the sum of the individual voltage spikes. The total voltage spike may scale with the number of magnetic-tunneling-junction layer stacks 32, 34, 36, 38 that are connected in series.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:

a first magnetic-tunneling-junction layer stack;

a second magnetic-tunneling-junction layer stack connected in a series connection to the first magnetic-tunneling-junction layer stack; and a pulsed power supply connected to the first magnetic-tunneling-junction layer stack and the second magnetic-tunneling-junction layer stack, the pulsed power supply configured to supply a pulsed current to the first magnetic-tunneling-junction layer stack and the second magnetic-tunneling-junction layer stack in the series connection, wherein the first magnetic-tunneling-junction layer stack is configured to back-hop in response to the pulsed current and produce a first current spike, and the second magnetic-tunneling-junction layer stack is configured to back-hop in response to the pulsed current and produce a second current spike.

2. The structure of claim 1 further comprising:

an operational amplifier having a first input connected to the first magnetic-tunneling-junction layer stack.

3. The structure of claim 2 wherein the first magnetic-tunneling-junction layer stack includes an electrode connected to the first input of the operational amplifier, a reference layer, a free layer, and a tunnel barrier layer, and the reference layer is disposed between the electrode and the free layer.

4. The structure of claim 3 wherein the first input of the operational amplifier is coupled to the electrode of the first magnetic-tunneling-junction layer stack, and the operational amplifier has a second input connected to ground.

5. The structure of claim 1 wherein the first magnetic-tunneling-junction layer stack includes an electrode, and the pulsed power supply is configured to supply the pulsed current to the electrode of the first magnetic-tunneling-junction layer stack.

6. The structure of claim 1 further comprising:

an operational amplifier having an output, wherein the second magnetic-tunneling-junction layer stack is connected to the output of the operational amplifier.

7. The structure of claim 6 wherein the second magnetic-tunneling-junction layer stack includes an electrode connected to the output of the operational amplifier, a reference layer, a free layer, and a tunnel barrier layer, and the free layer is disposed between the electrode and the reference layer.

8. The structure of claim 1 further comprising:

a spiking neural network including the first magnetic-tunneling-junction layer stack and the second magnetic-tunneling-junction layer stack.

9. The structure of claim 8 wherein the first current spike and the second current spike are configured to be additive.

10. The structure of claim 9 wherein the first current spike and the second current spike are configured to occur with a probability given by a Poisson probability distribution.

11. The structure of claim 1 further comprising:

a third magnetic-tunneling-junction layer stack connected in the series connection to the first magnetic-tunneling-junction layer stack and the second magnetic-tunneling-junction layer stack.

12. The structure of claim 11 wherein the first magnetic-tunneling-junction layer stack includes a first electrode, a first reference layer, a first free layer, and a first tunnel barrier layer, and the first free layer is disposed between the first electrode and the first reference layer.

13. The structure of claim 12 wherein the third magnetic-tunneling-junction layer stack includes a second electrode connected to the first electrode of the first magnetic-tunneling-junction layer stack, a second reference layer, a second free layer, and a second tunnel barrier layer, and the second reference layer is disposed between the second electrode and the second free layer.

14. The structure of claim 11 wherein the third magnetic-tunneling-junction layer stack includes a first electrode, a first reference layer, a first free layer, and a first tunnel barrier layer, and the first free layer is disposed between the first electrode and the first reference layer.

15. The structure of claim 14 wherein the second magnetic-tunneling-junction layer stack includes a second electrode connected to the first electrode of the third magnetic-tunneling-junction layer stack, a second reference layer, a second free layer, and a second tunnel barrier layer, and the second reference layer is disposed between the second electrode and the second free layer.

16. The structure of claim 1 further comprising:

a first wiring level including a first interconnect; and a second wiring level including a second interconnect, wherein the first magnetic-tunneling-junction layer stack and the second magnetic-tunneling-junction layer stack are disposed between the first wiring level and the second wiring level.

17. The structure of claim 16 wherein the first magnetic-tunneling-junction layer stack includes a first electrode that is connected to the first interconnect, the second magnetic-tunneling-junction layer stack includes a second electrode that is connected to the second interconnect, and the first interconnect is connected to the second interconnect.

18. A method comprising:

forming a first magnetic-tunneling-junction layer stack; and forming a second magnetic-tunneling-junction layer stack connected in a series connection to the first magnetic-tunneling-junction layer stack, wherein the first magnetic-tunneling-junction layer stack and the second magnetic-tunneling-junction layer stack are connected to a pulsed power supply, the pulsed power supply is configured to supply a pulsed current to the first magnetic-tunneling-junction layer stack and the second magnetic-tunneling-junction layer stack in the series connection, the first magnetic-tunneling-junction layer stack is configured to back-hop in response to the pulsed current and produce a first current spike, and the second magnetic-tunneling-junction layer stack is configured to back-hop in response to the pulsed current and produce a second current spike.

19. The structure of claim 1 further comprising:

an operational amplifier connected in parallel to the first magnetic-tunneling-junction layer stack and the second magnetic-tunneling-junction layer stack.

20. The structure of claim 19 wherein the operational amplifier has a feedback loop comprising first magnetic-tunneling-junction layer stack and the second magnetic-tunneling-junction layer stack in the series connection.

* * * * *